(12) United States Patent
Chen et al.

(10) Patent No.: US 10,168,124 B2
(45) Date of Patent: Jan. 1, 2019

(54) TRAJECTORY PREDICTION SYSTEM

(71) Applicants: Sintai Optical (Shenzhen) Co., Ltd., Shenzhen, Guandong Provice (CN); Asia Optical International, Ltd., Taichung (TW)

(72) Inventors: Yen-Chao Chen, Taichung (TW); Chih-Hsien Lin, Taichung (TW)

(73) Assignees: ASIA OPTICAL INTERNATIONAL LTD., Taichung (TW); SINTAI OPTICAL (SHENZHEN) CO., LTD., Taichung (TW)

( * ) Notice: Subject to any disclaimer, the term of this patent is extended or adjusted under 35 U.S.C. 154(b) by 235 days.

(21) Appl. No.: 14/998,998

(22) Filed: Mar. 15, 2016

(65) Prior Publication Data
US 2016/0305743 A1   Oct. 20, 2016

(30) Foreign Application Priority Data

Apr. 15, 2015   (CN) .......................... 2015 1 0178133

(51) Int. Cl.
*F41G 1/473*   (2006.01)
*F41G 3/16*   (2006.01)
(Continued)

(52) U.S. Cl.
CPC .............. *F41G 3/165* (2013.01); *F41G 1/38* (2013.01); *F41G 1/473* (2013.01); *F41G 3/06* (2013.01);
(Continued)

(58) Field of Classification Search
CPC ... F41G 1/38; F41G 1/473; F41G 3/06; F41G 3/08; F41G 3/165; G02B 13/16; G02B 23/14; G02B 25/001; H04N 7/183
(Continued)

(56) References Cited

U.S. PATENT DOCUMENTS 5,828,406 A * 10/1998 Parulski ............... H04N 1/0044
  348/220.1
7,905,046 B2 * 3/2011 Smith, III ................. F41G 1/38
  235/404
(Continued)

FOREIGN PATENT DOCUMENTS

CN   203785551 U   8/2014
CN   104246420 A   12/2014

*Primary Examiner* — Claude J Brown
(74) *Attorney, Agent, or Firm* — McClure, Qualey & Rodack, LLP (57) ABSTRACT

A trajectory prediction system for predicting a point of impact of an object shot from a ballistic device is provided. The trajectory prediction system includes an objective lens, an eyepiece lens optically coupled with the objective lens, an image sensor, a processor, and a display electrically connected to the processor and the image sensor. The image sensor, the processor, and the display are disposed between the objective lens and the eyepiece lens. When an external light reaches the image sensor through the objective lens, the image sensor transmits a first signal to the display, and the display shows an image according to the first signal. The processor calculates the trajectory of the object and transmits a second signal to the display, and the display simultaneously shows the image and at least one predictive point of impact according to the first and second signals.

20 Claims, 6 Drawing Sheets

(51) Int. Cl.
  *H04N 7/18* (2006.01)
  *G02B 23/14* (2006.01)
  *F41G 1/38* (2006.01)
  *F41G 3/06* (2006.01)
  *F41G 3/08* (2006.01)
  *G02B 13/16* (2006.01)
  *G02B 25/00* (2006.01)

(52) U.S. Cl.
  CPC .............. *F41G 3/08* (2013.01); *G02B 23/14* (2013.01); *H04N 7/183* (2013.01); *G02B 13/16* (2013.01); *G02B 25/001* (2013.01)

(58) Field of Classification Search
  USPC .......................................................... 235/404
  See application file for complete search history.

(56) References Cited

U.S. PATENT DOCUMENTS

| | | | | |
|---|---|---|---|---|
| 8,196,828 B2* | 6/2012 | Kelly | ................ | F41G 1/38 |
| | | | | 235/404 |
| 8,408,460 B2* | 4/2013 | Schneider | ............ | F41G 1/467 |
| | | | | 235/404 |
| 9,025,040 B2* | 5/2015 | Thyssen | ............ | H04N 5/23258 |
| | | | | 235/404 |
| 9,091,507 B2* | 7/2015 | Paterson | ............ | F41G 3/06 |
| 9,389,425 B2* | 7/2016 | Edwards | ............ | G02B 27/0189 |
| 9,689,643 B2 | 6/2017 | Farca et al. | | |
| 9,702,662 B1* | 7/2017 | Zhang | ............ | F41G 1/473 |
| 9,791,244 B2* | 10/2017 | Maryfield | ............ | F41G 11/00 |
| 9,964,382 B2* | 5/2018 | Stantchev | ............ | F41G 3/08 |
| 10,042,154 B1* | 8/2018 | Cross | ............ | G02B 23/10 |
| 2010/0258628 A1* | 10/2010 | Bay | ............ | F41G 1/35 |
| | | | | 235/404 |
| 2010/0282843 A1* | 11/2010 | Staley, III | ............ | F41G 1/48 |
| | | | | 235/404 |
| 2010/0301116 A1* | 12/2010 | Bennetts | ............ | F41G 1/12 |
| | | | | 235/404 |
| 2012/0000979 A1* | 1/2012 | Horvath | ............ | F41G 1/38 |
| | | | | 235/407 |
| 2012/0097741 A1* | 4/2012 | Karcher | ............ | F41G 1/38 |
| | | | | 235/404 |
| 2012/0118955 A1* | 5/2012 | Cox | ............ | F41G 1/38 |
| | | | | 235/404 |
| 2012/0182417 A1* | 7/2012 | Everett | ............ | F41G 1/30 |
| | | | | 348/135 |
| 2012/0298750 A1* | 11/2012 | McCarty | ............ | F41G 1/38 |
| | | | | 235/404 |
| 2013/0206836 A1* | 8/2013 | Paterson | ............ | F41G 3/08 |
| | | | | 235/404 |
| 2013/0228618 A1* | 9/2013 | Millett | ............ | F41G 1/38 |
| | | | | 235/407 |
| 2014/0110483 A1* | 4/2014 | Benson | ............ | G05B 1/01 |
| | | | | 235/404 |
| 2014/0124575 A1* | 5/2014 | Millett | ............ | F41G 1/473 |
| | | | | 235/407 |
| 2014/0166750 A1* | 6/2014 | Chen | ............ | F41G 1/40 |
| | | | | 235/404 |
| 2014/0166751 A1* | 6/2014 | Sammut | ............ | F41G 1/38 |
| | | | | 235/404 |
| 2014/0319215 A1* | 10/2014 | Farca | ............ | F41G 1/38 |
| | | | | 235/404 |
| 2016/0091282 A1* | 3/2016 | Baker | ............ | F41G 3/02 |
| | | | | 348/158 |
| 2018/0224652 A1* | 8/2018 | Havens | ............ | G02B 23/04 |

* cited by examiner

TRAJECTORY PREDICTION SYSTEM

CROSS REFERENCE TO RELATED APPLICATIONS

The present application is based on, and claims priority from, Chinese Patent Application No. 201510178133.2, filed on Apr. 15, 2015, the disclosure of which is hereby incorporated by reference herein in its entirety.

BACKGROUND OF THE INVENTION

Field of the Invention

The application relates in general to a trajectory prediction system, and in particular, to a trajectory prediction system having a display.

Description of the Related Art

Figure 1A:
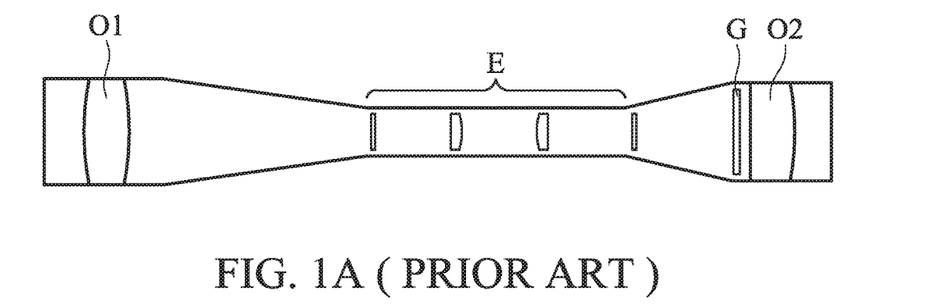
FIG. 1A is a schematic diagram of a conventional sight device.

As shown in FIG. 1A, a conventional sight device on a firearm at least comprises an objective lens O1, an upright group E, a glass reticle G, and an eyepiece lens O2, wherein the upright group E is disposed between the objective lens O1 and the eyepiece lens O2. The user can watch an image having a correct position from the eyepiece lens O2. However, the upright group E usually comprises many lenses having different radiuses of curvature, and those lenses are precisely disposed. Therefore, when the lenses deviate or break due to accidents, the sight device cannot work properly.

Figure 1B:
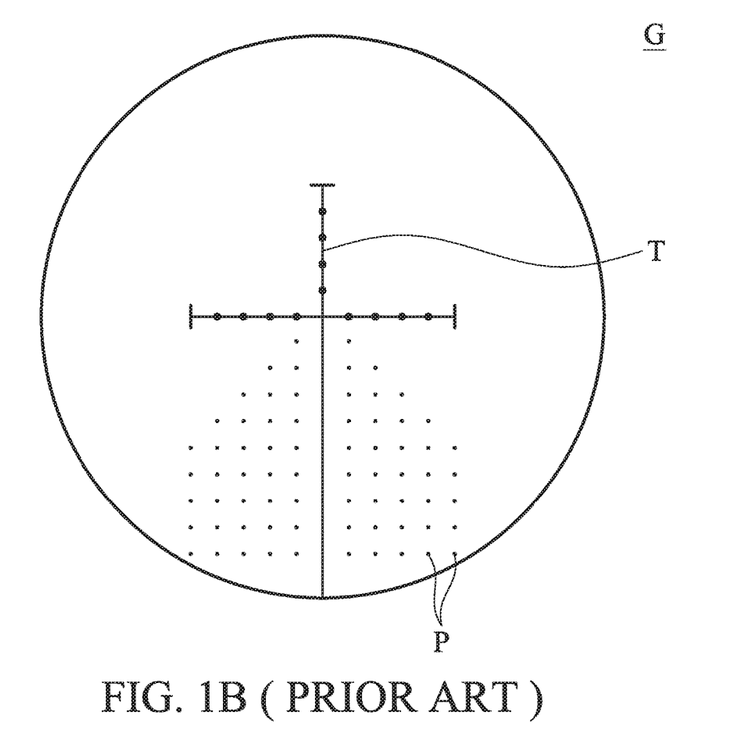
FIG. 1B is a schematic diagram of a glass reticle of the sight device in FIG. 1A.

Furthermore, referring to FIG. 1B, for ease of aiming, an aiming line T and a plurality of aiming points P are formed on the glass reticle G by etching. However, the aiming line T and the aiming points P obstruct the sight of the user, and the portion on the eyepiece lens O2 adjacent to the aiming line T and the aiming points P is opaque because of the traces of etching. Observation becomes harder.

BRIEF SUMMARY OF INVENTION

To address the deficiency of conventional electronic products, an embodiment of the invention provides a trajectory prediction system for predicting a point of impact of an object shot from a ballistic device. The trajectory prediction system includes an objective lens, an eyepiece lens optically coupled with the objective lens, an image sensor, a processor, and a display electrically connected to the processor and the image sensor. The image sensor, the processor, and the display are disposed between the objective lens and the eyepiece lens. When an external light reaches the image sensor through the objective lens, the image sensor transmits a first signal to the display, and the display shows an image according to the first signal. The processor calculates the trajectory of the object and transmits a second signal to the display, and the display simultaneously shows the image and at least one predictive point of impact according to the first and second signals.

In some embodiments, the display further simultaneously shows the image, the predictive point of impact, and a reticle.

In some embodiments, the trajectory prediction system further comprises an optical module, disposed between the objective lens and the image sensor.

In some embodiments, the processor calculates the trajectory of the object according to gravity.

In some embodiments, the processor calculates the trajectory of the object according to a wind-speed parameter.

In some embodiments, when the processor transmits the second signal to the display, the display shows a plurality of predictive points of impact according to the second signal, and the predictive points correspond to a plurality of predetermined distances from the trajectory prediction system.

In some embodiments, the trajectory prediction system further comprises a distance-measuring module for measuring the distance between the trajectory prediction system and a target.

In some embodiments, the trajectory prediction system further comprises an anemometer, electrically connected to the processor.

In some embodiments, the ratio between the transverse pixels of the image sensor and that of the display is the same as the ratio between the vertical pixels of the image sensor and that of the display.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the trajectory prediction system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 2:
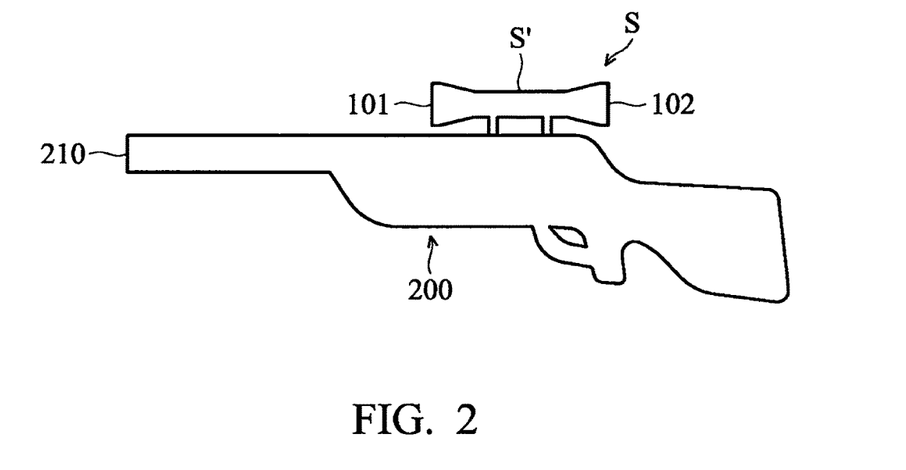
FIG. 2 is a schematic diagram of a trajectory prediction system disposed on a ballistic device according to an embodiment of the invention.

Referring to FIG. 2, a sight device S is disposed on a ballistic device 200 according to an embodiment of the invention. The user can watch a remotely located target using the sight device S, and shoot an object (not shown) from the ballistic device 200 to impact the target. In this embodiment, the ballistic device 200 is a firearm, and the object is a bullet. In some embodiments, the ballistic device 200 is a bow or a crossbow, and the object is an arrow.

Figure 3:
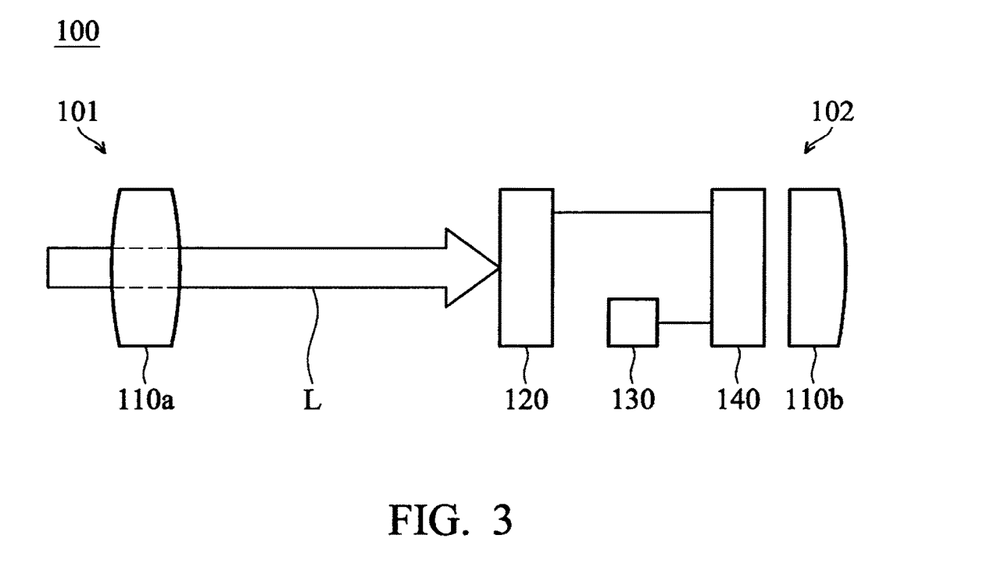
FIG. 3 is a schematic diagram of a trajectory prediction system according to an embodiment of the invention.

Referring to FIGS. 2 and 3, a trajectory prediction system 100 is disposed in a housing S' of the sight device S. The trajectory prediction system 100 primarily comprises an objective lens 110a, an image sensor 120, a processor 130, a display 140, and an eyepiece lens 110b, wherein the image sensor 120 and the processor 130 are electrically connected to the display 140. The image sensor 120, the processor 130 and the display 140 are disposed between the objective lens 110a and the eyepiece lens 110b. In this embodiment, the objective lens 110a is disposed on a first end 101 of the sight device S (FIG. 1), and the display 140 and the eyepiece lens 110b are disposed on a second end 102, wherein the first end 101 is closer to a shooting port 210 of the ballistic device 200 than the second end 102, and the shooting port 210 is used to shoot the object (such as a bullet) from the ballistic device 200.

Figure 4A:
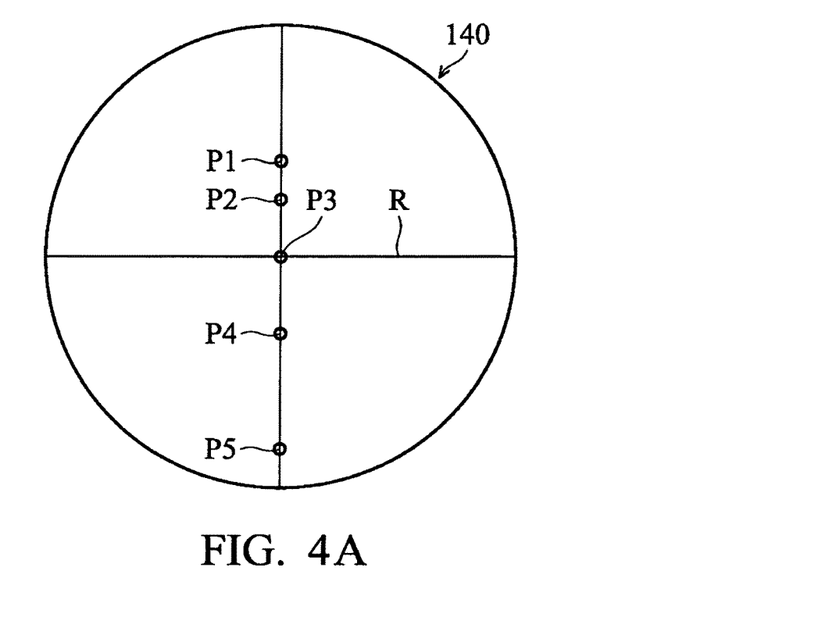
FIG. 4A is a schematic diagram of a screen showing by a display according to an embodiment of the invention.

Referring to FIGS. 3 and 4A, when an external light L reaches the image sensor 120 through the objective lens 110a, the image sensor 120 transmits a first signal to the display 140, and the display 140 shows a corresponding image according to the first signal. At the same time, the processor 130 can calculate the trajectory of the object shot from the shooting port 210 (a parabolic path, for example) and transmit a second signal to the display 140. The display 140 can simultaneously show the image and a plurality of predictive points of impact P1-P5 on the screen according to the first and second signals (FIG. 4A). Subsequently, the user can watch the image and the predictive points of impact P1-P5 on the screen of the display 140 to aim at the target.

It should be noted that, as shown in FIG. 4A, the processor 130 of the trajectory prediction system 100 in this embodiment can calculate the trajectory of the object shot from the shooting port 210 according to the influence of gravity, and the predictive points of impact P1-P5 corresponds to the different distances from the trajectory prediction system 100. For example, the predictive point of impact P1 represents a position of the object when the object is shot and the distance between the trajectory prediction system 100 and the object is about one hundred yards, and the predictive points of impact P2-P5 respectively represents the position of the object when the distance between the trajectory prediction system 100 and the object is about two hundred yards, three hundred yards, four hundred yards, and five hundred yards. Furthermore, the display 140 shows a reticle R for aiming. In some embodiments, the display 140 can show other aiming symbols to replace the reticle R.

Figure 4B:
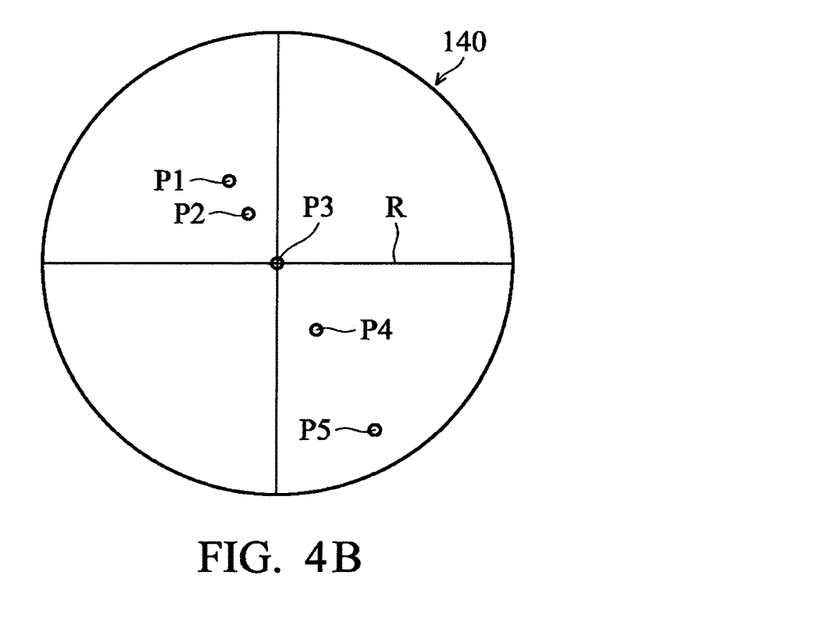
FIG. 4B is a schematic diagram of a screen showing by a display according to another embodiment of the invention.

Referring to FIG. 4B, in another embodiment of the invention, a wind-speed parameter outside the trajectory prediction system 100/ballistic device 200 can be inputted into the processor 130. Therefore, the processor 130 can calculate the trajectory of the object according to the influences of gravity and the wind-speed parameter and transmit the second signal to the display 140, and the display 140 can show different predictive points of impact P1-P5 on the screen. In some embodiments, the processor can merely calculate the trajectory of the object according to the influences of the wind-speed parameter.

The conventional sight device (as shown in FIG. 1B) only has the aiming line T and the aiming points P formed on the glass reticle G, and the user has to choose the aiming point P on their own according to the wind-speed parameter, which is inconvenient. On the contrary, when the user uses the trajectory prediction system 100 of the invention, he can directly and quickly aim at the target using the predictive points of impact P1-P5 on the screen of the display 140.

Figure 5A:
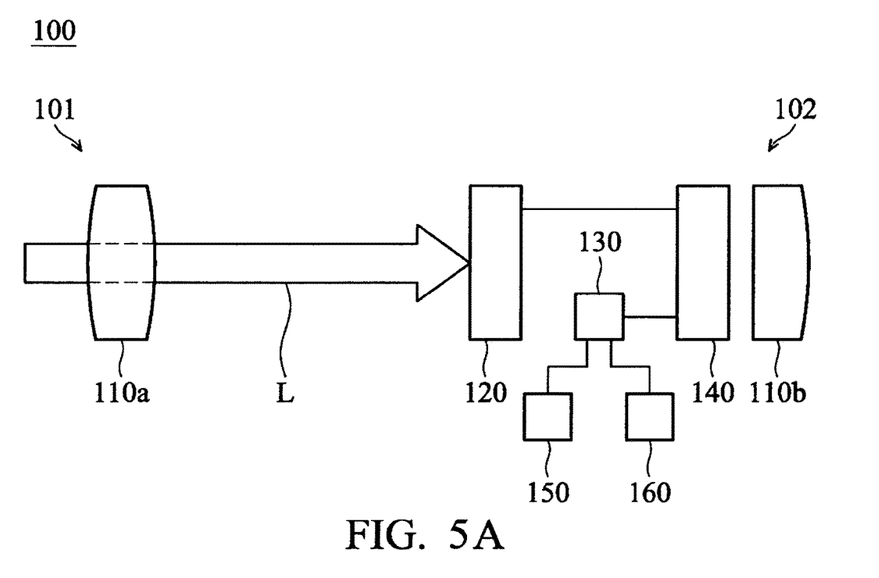
FIG. 5A is a schematic diagram of a trajectory prediction system according to another embodiment of the invention.
Figure 5B:
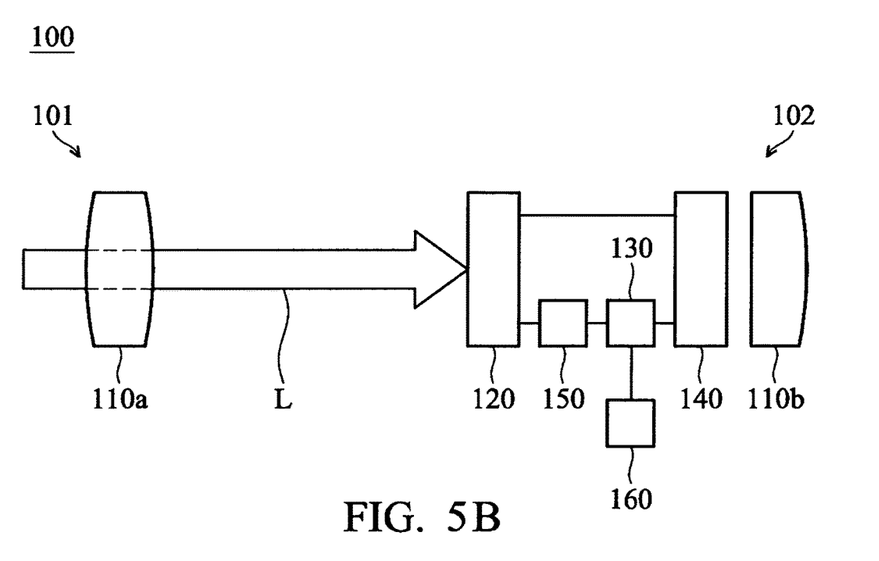
FIG. 5B is a schematic diagram of a trajectory prediction system according to another embodiment of the invention.

Referring to FIG. 5A, the trajectory prediction system 100 in another embodiment of the invention further comprises a distance-measuring module 150 and an anemometer 160. The distance-measuring module 150 and the anemometer 160 are electrically connected to the processor 130, wherein the distance-measuring module 150 can be used for measuring the distance between the trajectory prediction system 100 and the target, and the anemometer 160 can measure the wind speed outside the trajectory prediction system 100. For example, the distance-measuring module 150 can measure the distance between the trajectory prediction system 100 and the target via laser ranging. As shown in FIG. 5B, in another embodiment, the distance-measuring module 150 can also be electrically connected to the image sensor 120. When the external light reaches the image sensor 120, the image sensor 120 can transmit a reference image data to the distance-measuring module 150, and the distance-measuring module 150 can calculate the distance between the trajectory prediction system 100 and the target from the contrast ratio, sharpness, phase, dimensions ratio or other parameters of the reference image data. When the measurement is finished, the distance-measuring module 150 and the anemometer 160 transmit the measurement to the processor 130, and the processor 130 calculates the point of impact of the object corresponding to the distance and the wind-speed parameter and transmits the second signal to the display 140. Finally, the display 140 shows the corresponding predictive point of impact.

Figure 6:
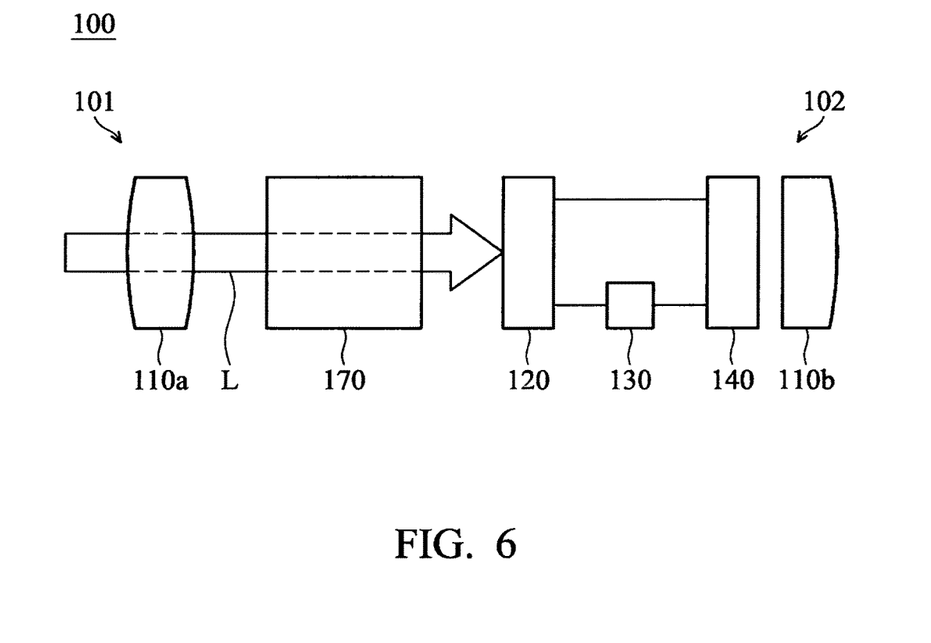
FIG. 6 is a schematic diagram of a trajectory prediction system according to another embodiment of the invention.

Referring to FIG. 6, the trajectory prediction system 100 in another embodiment of the invention further comprises an optical module 170 disposed between the objective lens 110a and the image sensor 120. The optical module 170 comprises a plurality of movable lenses (not shown), such that the user can change the position the lenses as required to adjust the region of the sight. It should be noted that, in this embodiment, the processor 130 is electrically connected to the image sensor 120, therefore, the processor 130 can transmit the second signal corresponding to the adjusted region of the sight to the display 140, and the display 140 can simultaneously show the image and a plurality of predictive points of impact at the right positions.

Figure 7:
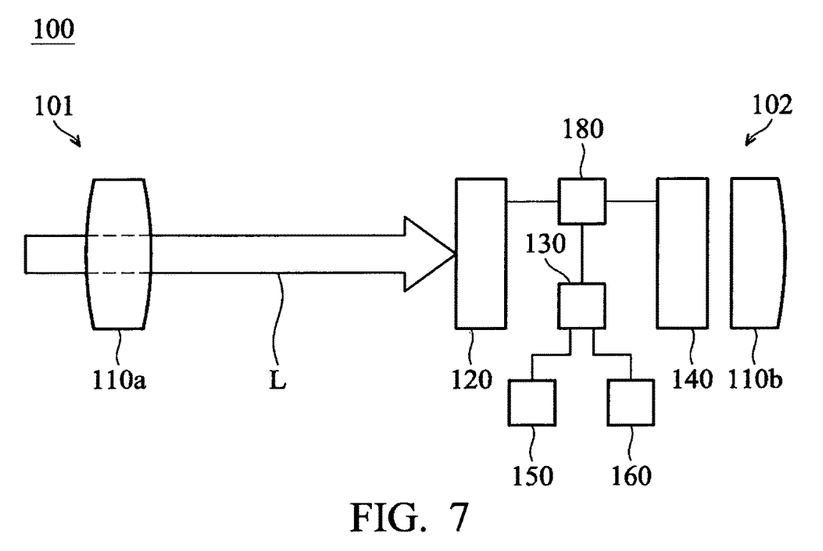
FIG. 7 is a schematic diagram of a trajectory prediction system according to another embodiment of the invention.
Figure 8:
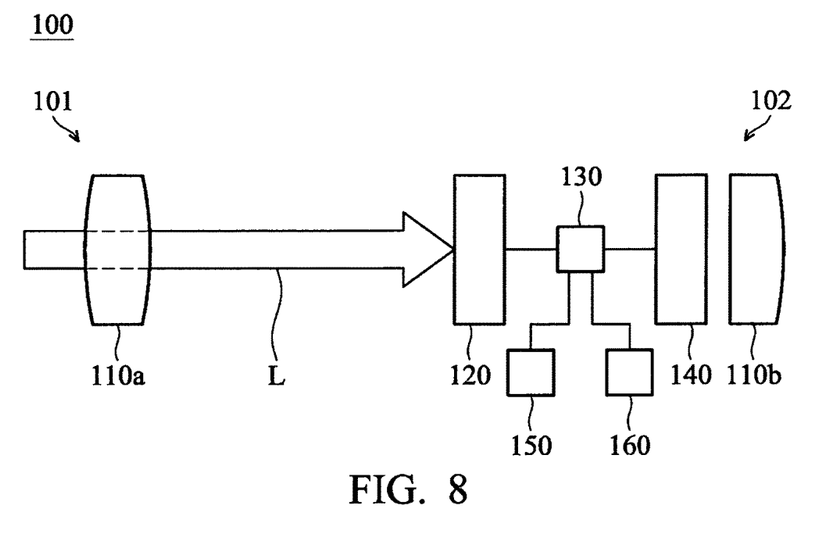
FIG. 8 is a schematic diagram of a trajectory prediction system according to another embodiment of the invention.

In some embodiments, the display 140 cannot convert the first signal from an electric signal to an image signal and show the corresponding image directly, such that a processor for converting (such as an Image Signal Processor) can be disposed in the trajectory prediction system 100. As shown in FIG. 7, in another embodiment, the trajectory prediction system 100 can further comprise a processor 180 electrically connected the image sensor 120 with the display 140 and disposed therebetween. The processor 180 can convert the first signal transmitted by the image sensor 120 from an electric signal to an image signal, and transmit the image signal of the first signal to the display 140. Moreover, the processor 130 is electrically connected to the display 140 via the processor 180. The processor 180 can convert the second signal transmitted by the processor 130 from an electric signal to an image signal, and transmit the image signal of the second signal to the display 140. As shown in FIG. 8, in another embodiment, the processor 130 has a converting function and a calculating function. Therefore, the processor 130 can convert the first signal transmitted by the image sensor 120 from an electric signal to an image signal and calculate the point of impact of the object, and transmit the first and second signals to the display 140.

In the above embodiments, the image sensor 120 can comprise a complementary metal-oxide-semiconductor (CMOS Sensor), and the display 140 can comprise an organic light-emitting diode panel (OLED Panel), a liquid-crystal display (LCD), or liquid crystal on silicon (LCoS). The image resolution of the image sensor 120 and that of the display 140 are proportional. For example, the image resolution of the image sensor 120 is 1600*1200, and the image resolution of the display 140 is 800*600. That is, the ratio between the transverse pixels of the image sensor 120 and that of the display 140 is the same as the ratio between the vertical pixels of the image sensor 120 and that of the display 140.

Furthermore, in some embodiments, the processor 130 can determine which region in the image is the ground by the contrast ratio, sharpness, phase, dimensions ratio or other parameters of the image. When the predictive point of impact calculated by the processor 130 is in the aforementioned region, the display does not show this predictive point.

In summary, a trajectory prediction system is provided in the invention. The display can directly show the predictive point according to the trajectory of the object calculated by the processor, and show the different aiming symbols, so that the screen is clean and easy to observe. Furthermore, the complex lenses group can be omitted, so that deviation or breakage of the lens can be prevented.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A trajectory prediction system for predicting a point of impact of an object shot from a ballistic device, the trajectory prediction system comprising:
   an objective lens;
   an eyepiece lens;
   an image sensor, optically coupled with the objective lens;
   a processor; and
   a display, electrically connected to the processor and the image sensor, wherein the image sensor, the processor and the display are disposed between the objective lens and the eyepiece lens, wherein when an external light reaches the image sensor through the objective lens, the image sensor transmits a first signal to the display, the display shows an image according to the first signal, wherein the processor calculates the trajectory of the object and transmits a second signal to the display, and the display simultaneously displays the image and displays a dot representing at least one predictive point of impact according to the first and second signals.

2. The trajectory prediction system as claimed in claim 1, wherein the display further simultaneously shows the image, the predictive point of impact, and a reticle.

3. The trajectory prediction system as claimed in claim 1, wherein the trajectory prediction system further comprises an optical module, disposed between the objective lens and the image sensor.

4. The trajectory prediction system as claimed in claim 1, wherein the processor calculates the trajectory of the object according to gravity.

5. The trajectory prediction system as claimed in claim 4, wherein when the processor transmits the second signal to the display, the display shows a plurality of predictive points of impact according to the second signal, and the predictive points correspond to a plurality of predetermined distances from the trajectory prediction system.

6. The trajectory prediction system as claimed in claim 1, wherein the processor calculates the trajectory of the object according to a wind-speed parameter.

7. The trajectory prediction system as claimed in claim 6, wherein when the processor transmits the second signal to the display, the display shows a plurality of predictive points of impact according to the second signal, and the predictive points correspond to a plurality of predetermined distances from the trajectory prediction system.

8. The trajectory prediction system as claimed in claim 1, wherein the trajectory prediction system further comprises a distance-measuring module for measuring the distance between the trajectory prediction system and a target.

9. The trajectory prediction system as claimed in claim 1, wherein the trajectory prediction system further comprises an anemometer, electrically connected to the processor.

10. The trajectory prediction system as claimed in claim 1, wherein the ratio between the transverse pixels of the image sensor and that of the display is the same as the ratio between the vertical pixels of the image sensor and that of the display.

11. A trajectory prediction system for predicting a point of impact of an object shot from a ballistic device, the trajectory prediction system comprising:
    an objective lens;
    an eyepiece lens;
    an image sensor, optically coupled with the objective lens;
    a processor; and
    a display, electrically connected to the processor and the image sensor, wherein the image sensor, the processor and the display are disposed between the objective lens and the eyepiece lens, wherein when an external light reaches the image sensor through the objective lens, the image sensor transmits a first signal to the display, the display shows an image according to the first signal, wherein the processor calculates the trajectory of the object and transmits a second signal to the display, and the display simultaneously shows the image and at least two predictive points of impact according to the first and second signals.

12. The trajectory prediction system as claimed in claim 11, wherein the display further simultaneously shows the image, the predictive points of impact, and a reticle.

13. The trajectory prediction system as claimed in claim 11, wherein the trajectory prediction system further comprises an optical module, disposed between the objective lens and the image sensor.

14. The trajectory prediction system as claimed in claim 11, wherein the processor calculates the trajectory of the object according to gravity.

15. The trajectory prediction system as claimed in claim 14, wherein when the processor transmits the second signal to the display, the display shows a plurality of predictive points of impact according to the second signal, and the predictive points correspond to a plurality of predetermined distances from the trajectory prediction system.

16. The trajectory prediction system as claimed in claim 11, wherein the processor calculates the trajectory of the object according to a wind-speed parameter.

17. The trajectory prediction system as claimed in claim 16, wherein when the processor transmits the second signal to the display, the display shows a plurality of predictive points of impact according to the second signal, and the predictive points correspond to a plurality of predetermined distances from the trajectory prediction system.

18. The trajectory prediction system as claimed in claim 11, wherein the trajectory prediction system further comprises a distance-measuring module for measuring the distance between the trajectory prediction system and a target.

19. The trajectory prediction system as claimed in claim 11, wherein the trajectory prediction system further comprises an anemometer, electrically connected to the processor.

20. The trajectory prediction system as claimed in claim 11, wherein the ratio between the transverse pixels of the image sensor and that of the display is the same as the ratio between the vertical pixels of the image sensor and that of the display.

* * * * *